United States Patent
Hatakeyama (10) Patent No.: US 9,800,811 B2
(45) Date of Patent: Oct. 24, 2017

(54) IMAGE CAPTURING APPARATUS AND CONTROL METHOD FOR THE SAME

(71) Applicant: CANON KABUSHIKI KAISHA, Tokyo (JP)

(72) Inventor: Koki Hatakeyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/070,933

(22) Filed: Mar. 15, 2016

(65) Prior Publication Data

US 2016/0277692 A1    Sep. 22, 2016

(30) Foreign Application Priority Data

Mar. 17, 2015 (JP) .................... 2015-053959

(51) Int. Cl.
*H04N 5/361* (2011.01)
*H04N 5/225* (2006.01)

(52) U.S. Cl.
CPC ........... *H04N 5/361* (2013.01); *H04N 5/2253* (2013.01)

(58) Field of Classification Search
None
See application file for complete search history.

(56) References Cited

U.S. PATENT DOCUMENTS

| | | | |
|---|---|---|---|
| 2006/0044463 A1* | 3/2006 | Talley | H04N 5/2253 348/373 |
| 2008/0095467 A1* | 4/2008 | Olszak | G02B 21/367 382/284 |
| 2011/0075015 A1* | 3/2011 | Cho | G02B 7/08 348/345 |
| 2012/0147232 A1* | 6/2012 | Takayama | H04N 5/3572 348/294 |

FOREIGN PATENT DOCUMENTS

JP    2012-182194 A    9/2012

* cited by examiner

*Primary Examiner* — Timothy J Henn
(74) *Attorney, Agent, or Firm* — Cowan, Liebowitz & Latman, P.C.

(57) ABSTRACT

An image capturing apparatus includes an image sensor, an optical system that forms a subject image on an image sensing plane of the image sensor, a driving unit that curves the image sensor, and a control unit that controls the driving unit to curve the image sensor to a curvature according to aberration of the optical system and image capturing conditions.

15 Claims, 10 Drawing Sheets

| FOCAL LENGTH (ZOOM POSITION) | CURVATURE SETTINGS |
|---|---|
| 140mm (TELE END) | A |
| 112mm | B |
| 84mm | C |
| 56mm | D |
| 28mm (WIDE END) | E |

| FOCAL LENGTH | CURVATURE SETTINGS | | |
| --- | --- | --- | --- |
| | LESS THAN ISO 400 | ISO400 TO ISO1600 | ISO 1600 OR MORE |
| 140mm | A | B | C |
| 112mm | B | C | D |
| 84mm | C | D | E |
| 56mm | D | E | F |
| 28mm | E | F | G |

| FOCAL LENGTH | CURVATURE SETTINGS | | |
|---|---|---|---|
| | SHUTTER SPEED LESS THAN 1/30 SEC | SHUTTER SPEED 1/30 SEC TO 1 SEC | SHUTTER SPEED 1 SEC OR MORE |
| 140mm | A | B | C |
| 112mm | B | C | D |
| 84mm | C | D | E |
| 56mm | D | E | F |
| 28mm | E | F | G |

| FOCAL LENGTH | CURVATURE SETTINGS | | |
| --- | --- | --- | --- |
| | TEMPERATURE LESS THAN 40°C | TEMPERATURE 40°C TO 50°C | TEMPERATURE 50°C OR MORE |
| 140mm | A | B | C |
| 112mm | B | C | D |
| 84mm | C | D | E |
| 56mm | D | E | F |
| 28mm | E | F | G |

| FOCAL LENGTH | CURVATURE SETTINGS | | |
|---|---|---|---|
| | LESS THAN F4 | F4 TO F8 | F8 OR MORE |
| 140mm | A | B | C |
| 112mm | B | C | D |
| 84mm | C | D | E |
| 56mm | D | E | F |
| 28mm | E | F | G |

FIG. 10B

IMAGE CAPTURING APPARATUS AND
CONTROL METHOD FOR THE SAME

BACKGROUND OF THE INVENTION

Field of the Invention

The present invention relates to an image capturing apparatus and a method of controlling the same.

Description of the Related Art

An aberration called a curvature of field occurs in imaging optical systems used in image capturing apparatuses such as digital cameras, whereby a shift in image forming positions occurs in the optical axis direction between the central portion and the peripheral portion of the image sensing plane. For this reason, conventionally, correction is performed such that the curvature of field aberration is reduced with an optical system configuration in which a plurality of lenses are combined. In contrast to this, recently, image sensors have been proposed in which the aforementioned curvature of field aberration is corrected by curving the image sensor itself, that is, the image sensing plane. It is conceivable that curving the image sensing plane to correct the curvature of field aberration allows for simplification of the optical system, and that the necessity to combine a large number of lenses is reduced.

Also, many cameras are equipped with an optical zoom function and the zoom lens position differs according to the zoom magnification rate, and thus the state of the curvature of field also varies. In contrast to this, technology that controls the curvature to which the image sensing plane is curved according to the state of the curvature of field has been proposed (Japanese Patent Laid-Open No. 2012-182194).

Dark current generally occurs in image sensors and there are cases where noise caused by dark current is prominent, particularly during periods of high sensitivity and long exposure times, and therefore various types of noise reduction processing are executed. On the other hand, it is known that, in an image sensor with a curved image sensing plane, dark current that occurs in the image sensor is reduced by tensile stress when the image sensor is curved.

However, as described in Japanese Patent Laid-Open No. 2012-182194, the amount by which dark current is reduced varies when the curvature at which the image sensing plane is curved is varied according to the zoom magnification rate, and there are cases where noise cannot be sufficiently reduced, even if noise reduction processing is performed.

SUMMARY OF THE INVENTION

The present invention has been made in light of the issues described above, and effectively reduces noise in captured images in an image capturing apparatus that has a function of curving the image sensor.

According to a first aspect of the present invention, there is provided an image capturing apparatus comprising: an image sensor; an optical system configured to form a subject image on an image sensing plane of the image sensor; a driving unit configured to curve the image sensor; and a control unit configured to control the driving unit to curve the image sensor to a curvature according to aberration of the optical system and image capturing conditions.

According to a second aspect of the present invention, there is provided a method of controlling an image capturing apparatus that includes an image sensor, an optical system configured to form a subject image on an image sensing plane of the image sensor, and a driving unit configured to curve the image sensor, the method comprising: controlling the driving unit to curve the image sensor to a curvature according to aberration of the optical system and image capturing conditions.

Further features of the present invention will become apparent from the following description of exemplary embodiments with reference to the attached drawings.

DESCRIPTION OF THE EMBODIMENTS

Embodiments of the present invention will be described in detail below with reference to the attached drawings.

First Embodiment

Figure 1:
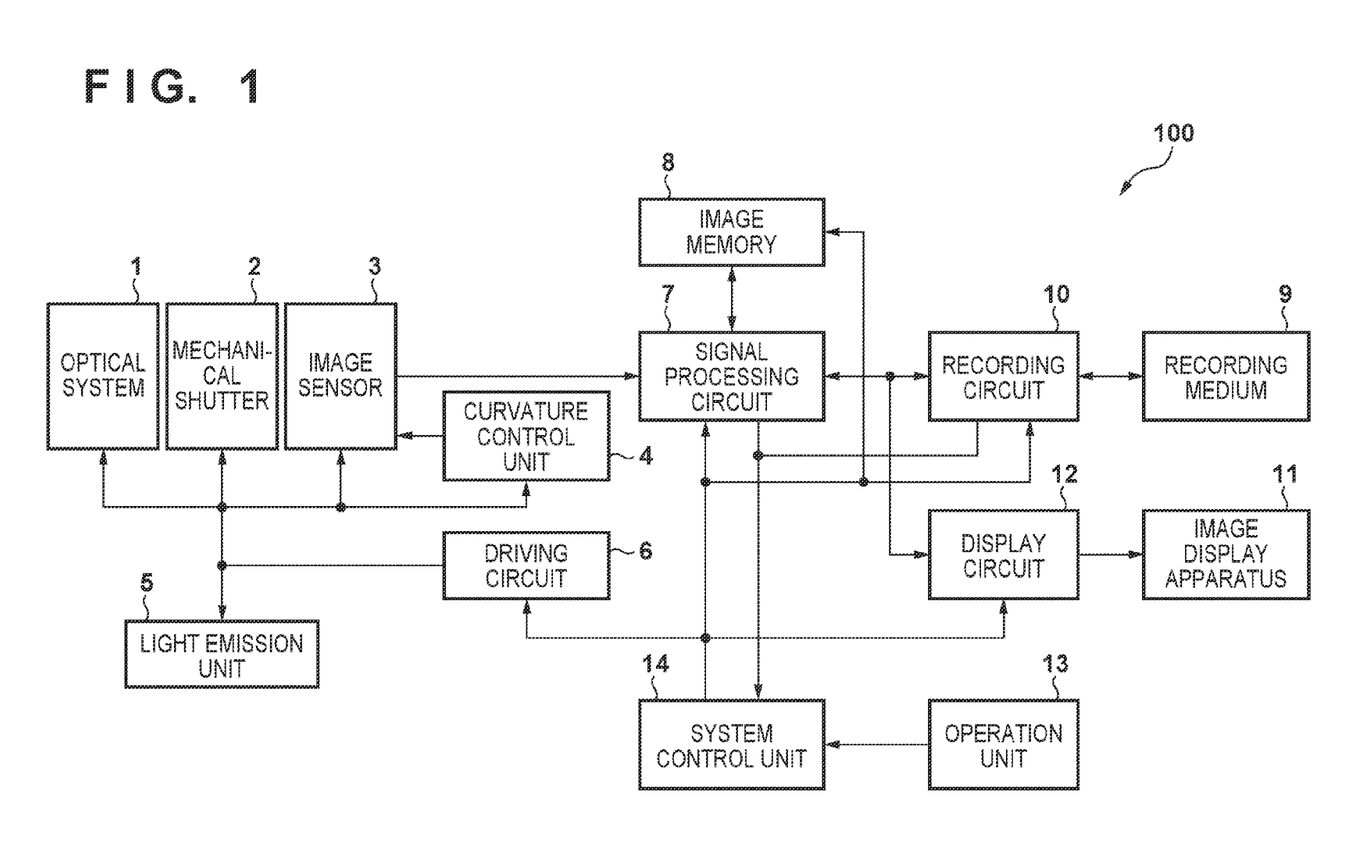
FIG. 1 is a block diagram showing a configuration of an image capturing apparatus according to a first embodiment of the present invention.

FIG. 1 is a block diagram showing a configuration of an image capturing apparatus according to a first embodiment of the present invention. An image capturing apparatus 100 according to the present embodiment includes an optical system 1 that has a lens and an aperture, a mechanical shutter 2, an image sensor 3, a curvature control unit 4, a light emission unit 5 such as a strobe, and a driving circuit 6. The curvature control unit 4 is for correcting a curvature of field aberration by controlling the curvature of the image sensing plane of the image sensor 3 according to the curvature of field aberration of the optical system 1 that forms a subject image on the image sensing plane of the image sensor 3. The driving circuit 6 drives and controls the optical system 1, the mechanical shutter 2, the image sensor 3, the curvature control unit 4, and the light emission unit 5.

Also, the image capturing apparatus 100 includes a signal processing circuit 7 that performs the necessary signal processing on image data that is output from the image sensor 3, an image memory 8 that stores image data that has undergone signal processing, and a recording medium 9 that is detachable from the image capturing apparatus 100. Furthermore, the image capturing apparatus 100 includes a recording circuit 10 that records the image data that has undergone signal processing to the recording medium 9, an image display apparatus 11 that displays the image data that has undergone signal processing, a display circuit 12 that displays an image on the image display apparatus 11, and an operation unit 13 that accepts operations made by the user. A system control unit 14 controls the entire image capturing apparatus including the units described above.

The system control unit 14 adjusts the amount of light from the subject incident on the image sensor 3 by controlling the aperture of the optical system 1 according to brightness. Furthermore, the system control unit 14 varies the charge storage time of the image sensor 3 via the driving circuit 6 to control the amount of exposure. The image sensor 3 converts the subject image formed on the image sensing plane into signal charge of an amount that corresponds to the amount of light from the subject and then stores the signal charge, and the stored signal charge is readout as a signal voltage by a driving pulse that is input from the driving circuit 6. Thereafter, an image signal converted into a digital signal by an A/D converter built into the image sensor 3 is output to the signal processing circuit 7.

In the signal processing circuit 7, image processing such as color conversion processing, white balance processing and gamma correction processing, resolution conversion processing, image compression processing, image correction processing, and the like are performed on the input digital image signal. The image memory 8 is used to temporarily store digital image signals undergoing signal processing, and to store image data consisting of digital image signals that have undergone signal processing. The image data that has undergone signal processing by the signal processing circuit 7 and the image data stored in the image memory 8 are converted into data suitable for the recording medium 9 by the recording circuit 10, and recorded to the recording medium 9. Here, data suitable for the recording medium 9 is file system data that has a hierarchical structure, for example. Also, after the image data has undergone resolution conversion processing by the signal processing circuit 7, the image data is converted into a signal suitable for the image display apparatus 11 by the display circuit 12, and displayed on the image display apparatus 11. Here, a signal suitable for the image display apparatus 11 is an NTSC system analog signal, an RGB signal for LCD display, and the like, for example.

The operation unit 13 is a user interface that has operation members such as a power button, a shutter button, a zoom lever, and the like. The system control unit 14 performs the necessary control on the driving circuit 6, the signal processing circuit 7, the image memory 8, the recording circuit 10, and the display circuit 12. Also, the system control unit 14 performs the necessary control according to signals from the operation unit 13.

Figure 2:
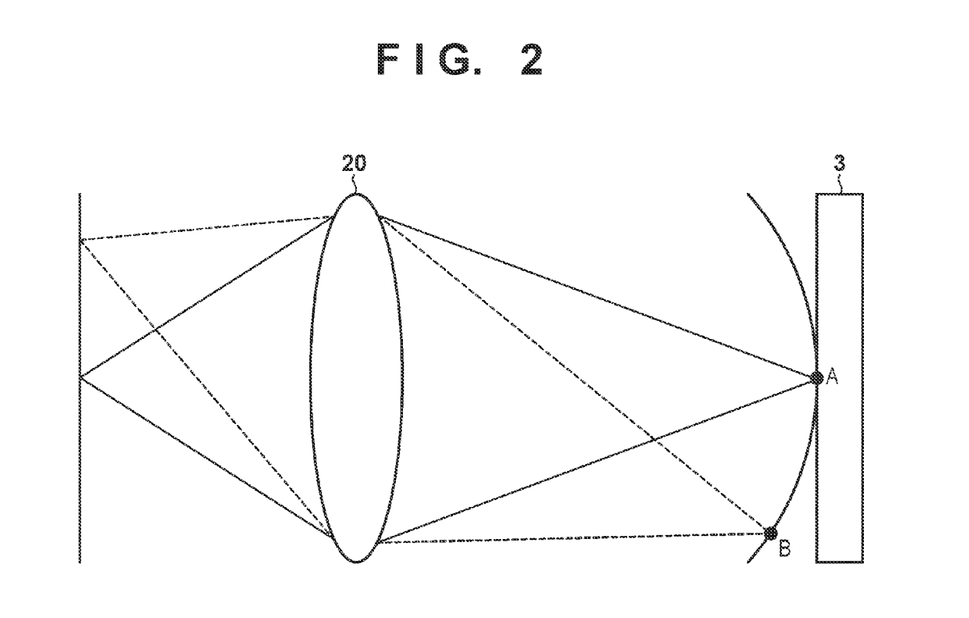
FIG. 2 is a diagram illustrating a curvature of field caused by an optical lens.

Next, FIG. 2 is a diagram showing the manner in which a subject image is formed with a lens 20 in the optical system 1. Generally, the optical lens 20 has an aberration called a curvature of field. In FIG. 2, the center of the image sensor 3 coincides with the optical axis. Even in a case where the image forming position in the central portion of the image capturing region of the image sensor 3 is aligned on an image sensing plane A, the image forming position shifts to a position B removed from the image sensing plane due to the influence of the curvature of field in the peripheral portion of the image capturing region, and therefore the focal position is shifted. Such a shift in the focal position is the cause of image quality deterioration in the peripheral portion of the image. The state of this curvature of field differs depending on the type of the lens 20, and in the case where the lens 20 is a zoom lens, the state of the curvature of field also varies depending on the object-side focal length.

Figure 3A:
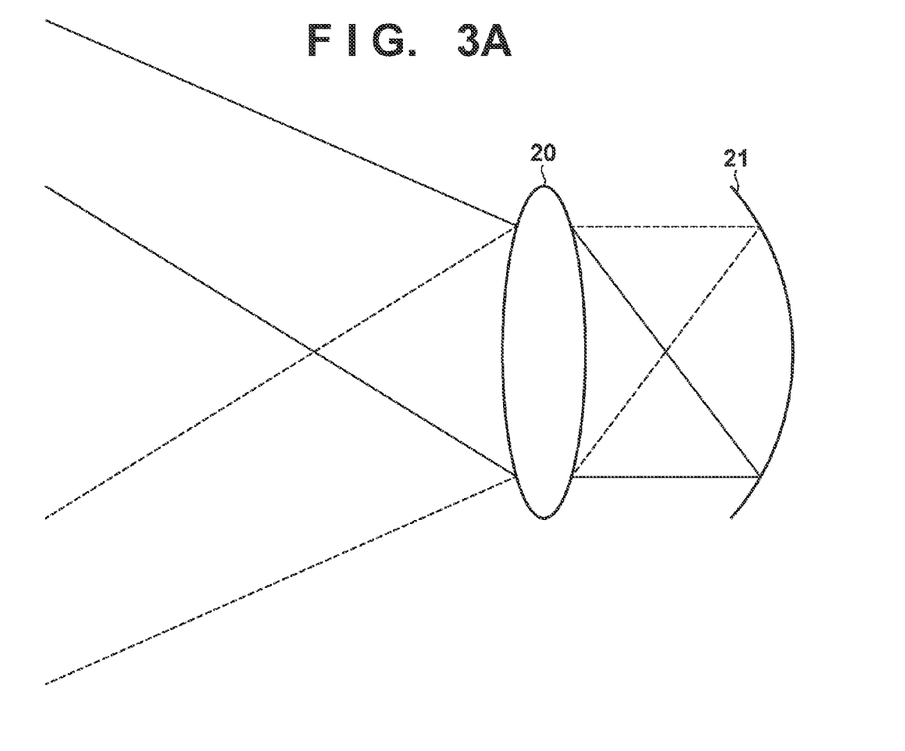
FIGS. 3A and 3B are diagrams showing a difference in a curvature of field according to a focal length (zoom position).
Figure 3B:
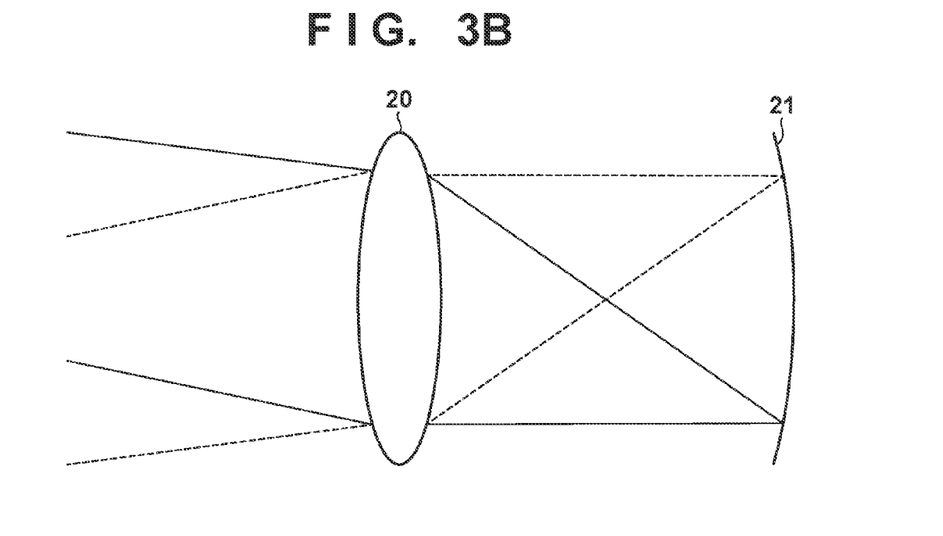

FIGS. 3A and 3B are diagrams showing a difference in the curvature of field according to the object-side focal length (zoom position). FIG. 3A shows the case of the focal length on the wide angle side, in which case the degree of the curvature of field is large and warping of an image forming surface (that is, the plane in focus) is large. FIG. 3B shows the case of the focal length on the telescopic side, in which case the curvature of field is small compared to that of the wide angle side, and warping of the image forming surface 21 is small. For this reason, in the image sensor according to the present embodiment, by controlling the curvature to which the image sensing plane is curved according to the state of the curvature of field, the curvature of field aberration is reduced regardless of the focal length (zoom position).

Figure 4A:
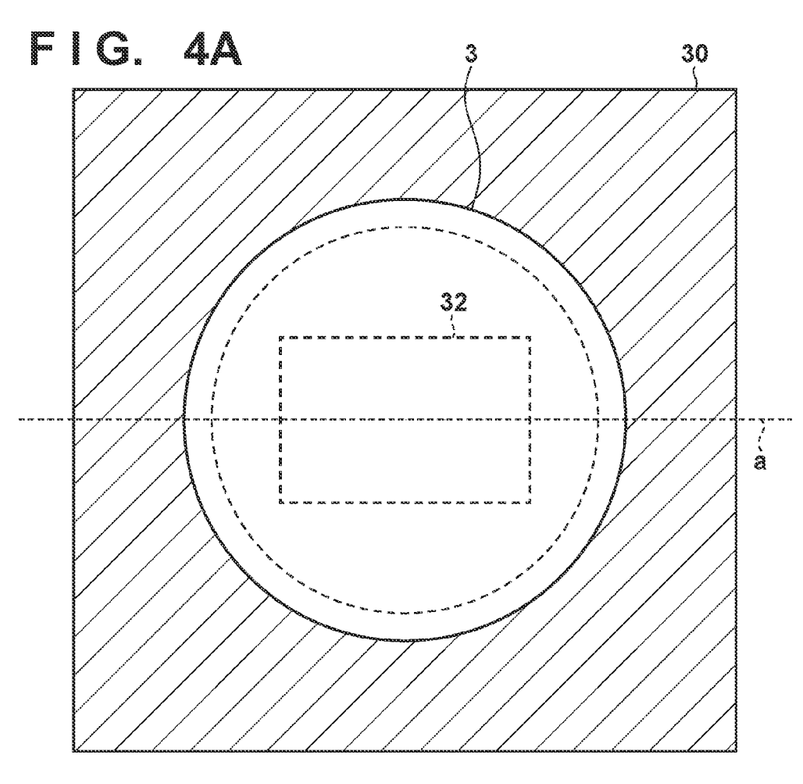
FIGS. 4A and 4B are diagrams showing an image sensor and a configuration for controlling a curvature of an image sensing plane thereof.
Figure 4B:
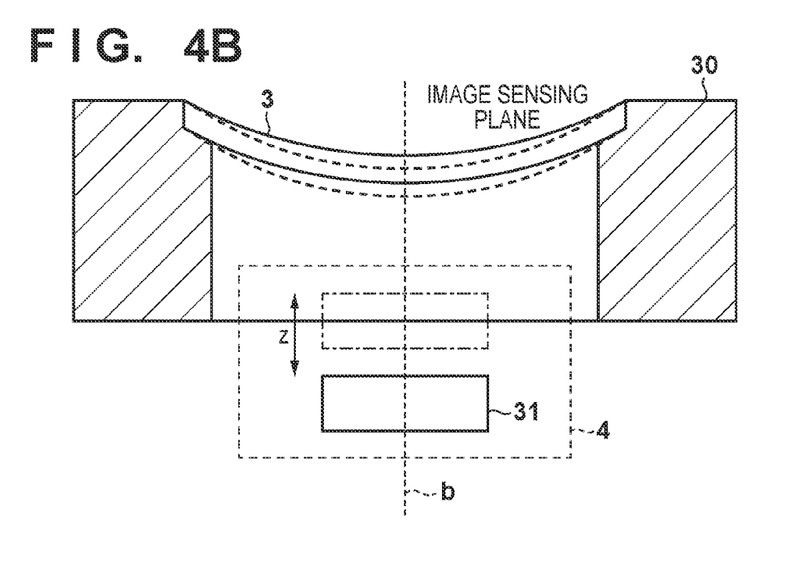

FIGS. 4A and 4B are diagrams showing an image sensor according to the present invention and a configuration for controlling the curvature of an image sensing plane thereof. FIG. 4A is a diagram of the image sensor viewed from the subject side, and FIG. 4B is a side view. In FIGS. 4A and 4B, the image sensor 3 supported by a base 30 has an image sensing plane 32 in which a plurality of pixels each including a photoelectric conversion unit are arranged in a matrix formed on one surface, and has a magnetic film formed on the back surface on the opposite side. There is a circular space in the center of the base 30 and the curvature control unit 4 for controlling the curvature of the image sensor 3, that is to say, the image sensing plane, is arranged therebelow. The curvature control unit 4 is configured to include a magnet 31, which is an electromagnetic force generation apparatus that can move in the direction orthogonal to the image sensing plane of the image sensor 3, and an actuator, which is not shown in the drawings, for moving the magnet 31. As shown in FIG. 4B, the magnet 31 is controlled to move within a range indicated by arrows z from the position indicated by a solid line to the position indicated by a dashed line, along an axial line b that is orthogonal to the image sensing plane and passes through the center of the image sensor 3. Accordingly, by controlling the magnetic force that attracts the back surface of the image sensor 3 by moving the magnet 31 within the range indicated by the arrows z, the curvature of the image sensor 3 can be varied suitably.

Figure 5A:
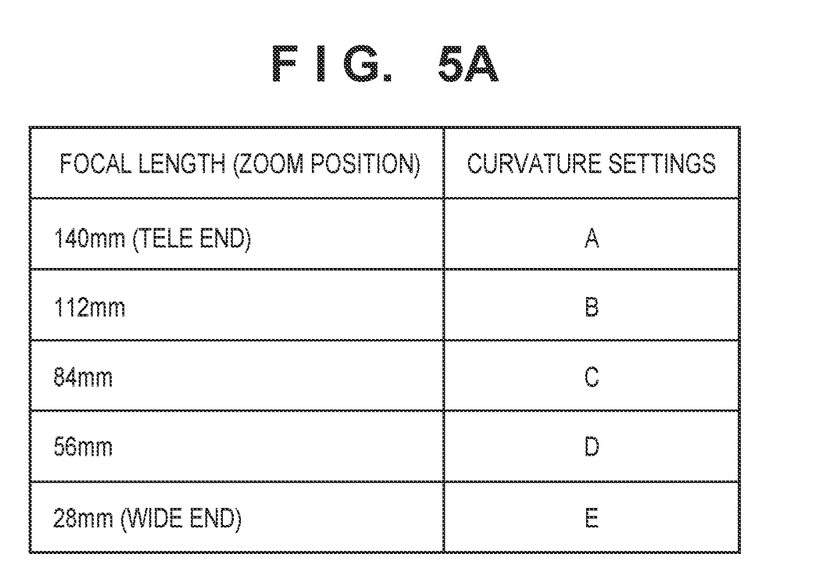
FIGS. 5A and 5B are diagrams showing a relation between a focal length (zoom position) and a curvature setting for an image sensing plane, in a case where a curvature of field is to be corrected.
Figure 5B:
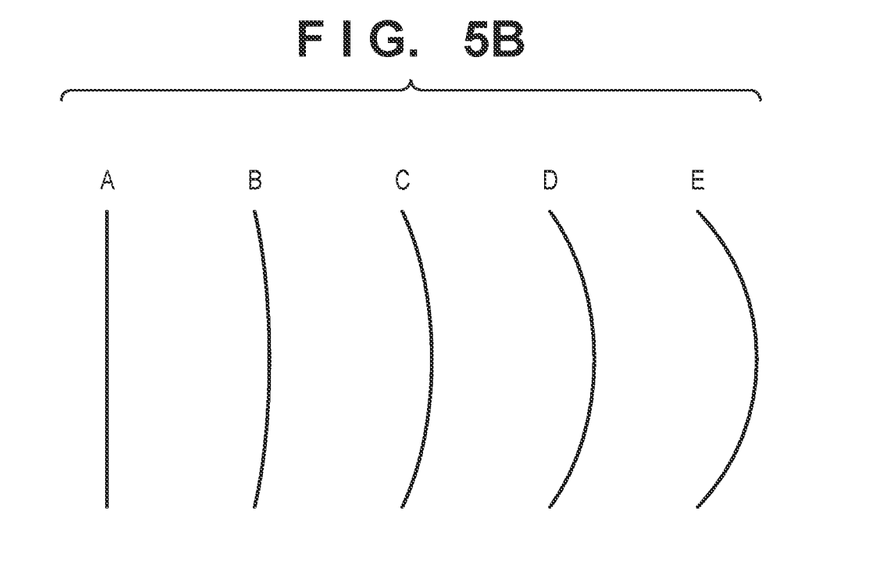

FIGS. 5A and 5B are diagrams showing the relation between the object-side focal length (zoom position) and the curvature settings of the image sensing plane of the image capturing apparatus according to the present embodiment. Here, an example in which the area from the wide end to the tele end is divided into five steps and zoom control is performed stepwise will be described. FIG. 5A is a table showing a relation between the five steps of focal length (zoom position) and the corresponding curvature settings of the image sensing plane. FIG. 5B is a schematic diagram showing the image sensing plane 32 on an axial line a in FIG. 4A and the curvature (bend) of the image sensing plane 32 corresponding to the respective curvature settings.

The state of the curvature of field on an image forming surface side varies depending on the object-side focal length (zoom position). In order to address this, specifically, on the wide angle side, the magnet 31 is brought closer to the image sensor 3 to increase the tensile stress and to increase the bend of the image sensing plane (reduce the radius of curvature). On the other hand, on the telescopic side, the magnet 31 is distanced from the image sensor 3 to reduce the tensile stress and to reduce the bend of the image sensing plane (increase the radius of curvature). Accordingly, the curvature of field aberration can be reduced regardless of the focal length.

Figure 6:
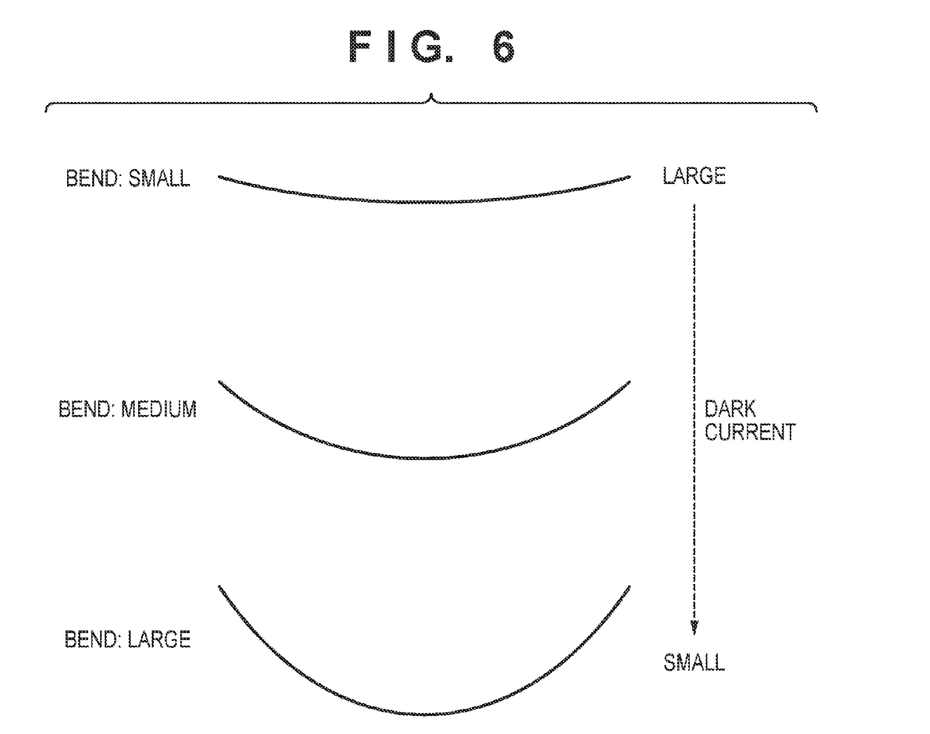
FIG. 6 is a diagram showing a relation between curvature and dark current in an image sensor.

FIG. 6 is a diagram showing a relation between curvature and dark current in the image sensor according to the present embodiment. It is known that dark current that occurs in the image sensor 3 is reduced by tensile stress that occurs when forming the image sensor 3 into a curved shape. In the present embodiment, the tensile stress is larger and dark current that occurs in the image sensor 3 is reduced in the state where the image sensing plane is in a curved state because the magnet 31 has been brought closer to the image sensor 3. In the present embodiment, dark current is reduced by using these characteristics and controlling the curvature of the image sensor 3.

The method of controlling the curvature of the image sensor 3 to reduce dark current in the first embodiment according to the present embodiment will be described below.

In image capturing apparatuses such as digital still cameras and digital video cameras, it is normal to be able to change the sensitivity (ISO sensitivity). There are cases where the photographer can select an arbitrary ISO sensitivity by turning a dial or selecting through a menu setting. Alternatively, there are cases where the camera automatically sets the optimal ISO sensitivity according to the scene to be captured and executes image capturing. The ISO sensitivity of the digital camera is set by changing the internal circuit gain. In the case where the ISO sensitivity is low, the circuit gain is small, and in the case where the ISO sensitivity is high, the circuit gain is large. Dark current noise that occurs in the image sensor, which is the issue in question, changes in degree depending on the circuit gain. This is because the noise caused by the dark current component is amplified as the gain increases.

Figure 7A:
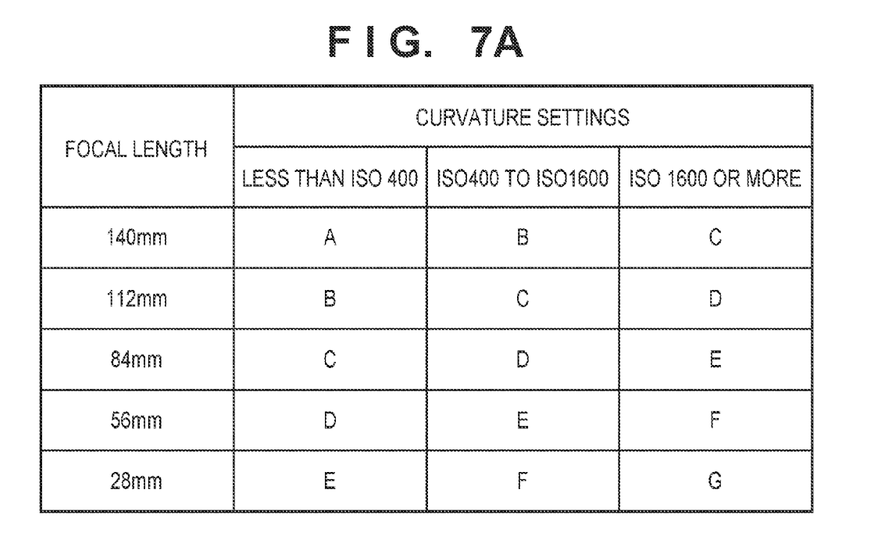
FIGS. 7A and 7B are diagrams illustrating a method of controlling curvature of an image sensor according to ISO sensitivity.
Figure 7B:
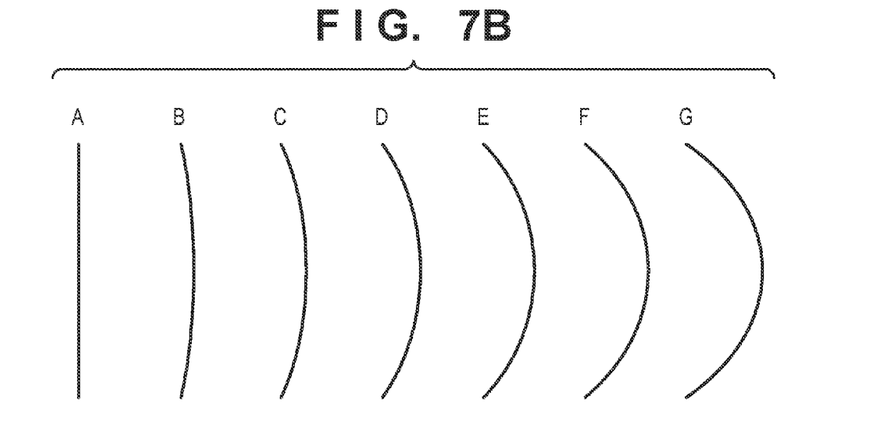

FIGS. 7A and 7B are diagrams illustrating a method of controlling the curvature of an image sensor according to ISO sensitivity. In FIG. 7A, the left-most column of the curvature settings (less than ISO 400) is the same as that in the curvature settings in the case of correcting the curvature of field in FIG. 5A. If the ISO sensitivity at these curvature settings is high (that is, if the gain is large), noise caused by dark current is also amplified and becomes prominent, and the noise becomes prominent in the captured image.

For example, when the ISO sensitivity is at ISO 400 or more and 1600 or less, the curvature setting is shifted one step as shown by the curvature settings in the central column. Specifically, if the focal length is 28 mm, the curvature setting that is suitable for correcting the curvature of field aberration is E, but the curvature setting is shifted by one step to F. That is to say, as shown in the schematic diagram in FIG. 7B, settings are performed so that the bend (curvature) of the image sensing plane of the image sensor 3 is increased. This is because tensile stress is increased the larger the bend (curvature) of the image sensor is, and dark current that occurs is reduced.

Also, at ISO 1600 or more, the curvature setting is further shifted one step as shown by the curvature settings in the right-most column of the curvature settings. If the focal length is 28 mm, the curvature setting suitable for correcting the curvature of field aberration is E, but the curvature setting is shifted by two steps to G. This is to further reduce noise caused by dark current.

As described above, in the present embodiment, the curvature to which the image sensor is curved according to the ISO sensitivity is set to a curvature at which the dark current is reduced by more than at a curvature suitable for correcting the curvature of field aberration of the optical lens. Accordingly, noise in the captured image can be reduced.

Second Embodiment

The method of controlling the curvature of the image sensor 3 to reduce dark current in the second embodiment according to the present invention will be described below. Note that the configuration of the image capturing apparatus is the same as that for the first embodiment.

Dark current noise that occurs in the image sensor also changes in degree depending on the shutter speed (exposure time). The longer the shutter speed, the greater the noise caused by the dark current component.

Figure 8A:
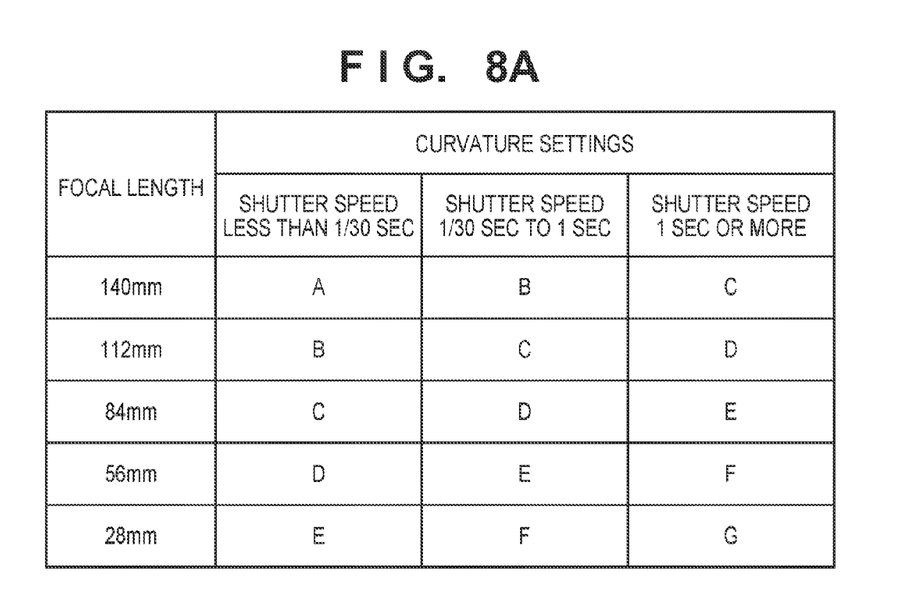
FIGS. 8A and 8B are diagrams illustrating a method of controlling curvature of an image sensor according to shutter speed.
Figure 8B:
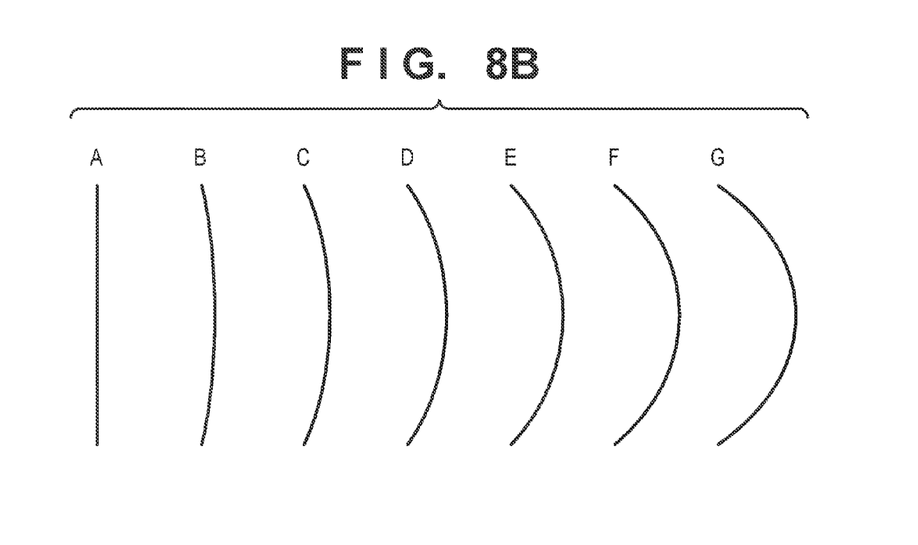

FIGS. 8A and 8B are diagrams illustrating a method of controlling the curvature of an image sensor according to shutter speed. In FIG. 8A, the left-most column of the curvature settings (shutter speed less than 1/30 sec) is the same as the curvature settings in the case of correcting the curvature of field in FIG. 5A. If the shutter speed increases, the noise caused by dark current increases, and the noise in the captured image becomes prominent.

For example, in the case where the shutter speed is 1/30 sec or more and 1 sec or less, the curvature setting is shifted by one step as shown by the curvature settings in the middle column of the curvature settings. Specifically, if the focal length is 28 mm, the curvature setting suitable for correcting the curvature of field aberration is E, but the curvature setting is shifted by one step to F. That is to say, as shown in the schematic diagram in FIG. 8B, settings are performed so that the bend (curvature) of the image sensing plane of the image sensor 3 is increased. This is because tensile stress is increased the larger the bend (curvature) of the image sensor is, and dark current that occurs is reduced.

Also, if the shutter speed is 1 second or more, the curvature setting is further shifted by one step as shown by the curvature settings in the right-most column of the curvature settings. If the focal length is 28 mm, the curvature setting suitable for correcting the curvature of field aberration is E, but the curvature setting is shifted by two steps to G. This is to further reduce (mitigate) noise caused by dark current.

As described above, in the present embodiment, the curvature to which the image sensor is curved according to the shutter speed is set to a curvature at which the dark current is reduced by more than at a curvature suitable for correcting the curvature of field aberration of the optical lens. Accordingly, noise in the captured image can be reduced.

Third Embodiment

Next, the method of controlling the curvature of the image sensor 3 to reduce dark current in the third embodiment according to the present invention will be described below. Note that the configuration of the image capturing apparatus is the same as that for the first embodiment.

Dark current noise that occurs in the image sensor also changes in degree depending on the temperature at image capture. The higher the temperature, the greater the noise caused by the dark current component.

Figure 9A:
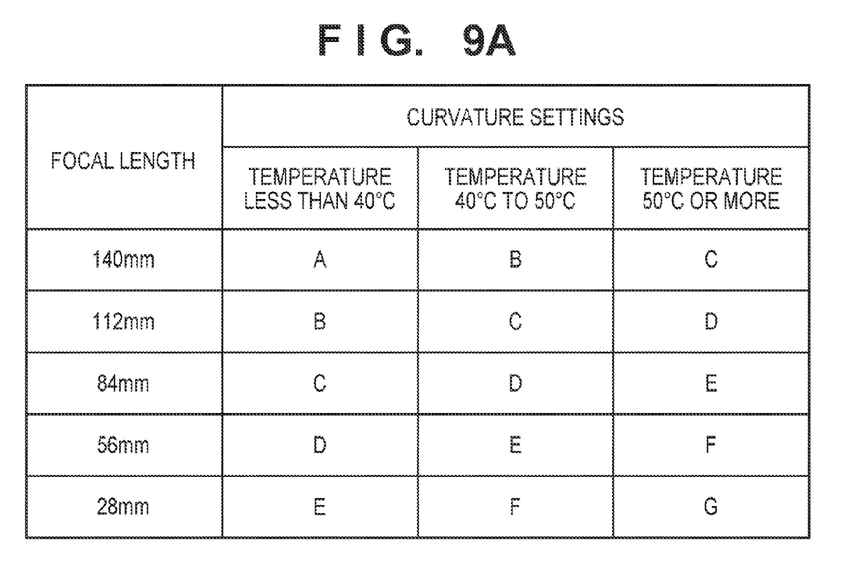
FIGS. 9A and 9B are diagrams illustrating a method of controlling curvature of an image sensor according to temperature.
Figure 9B:
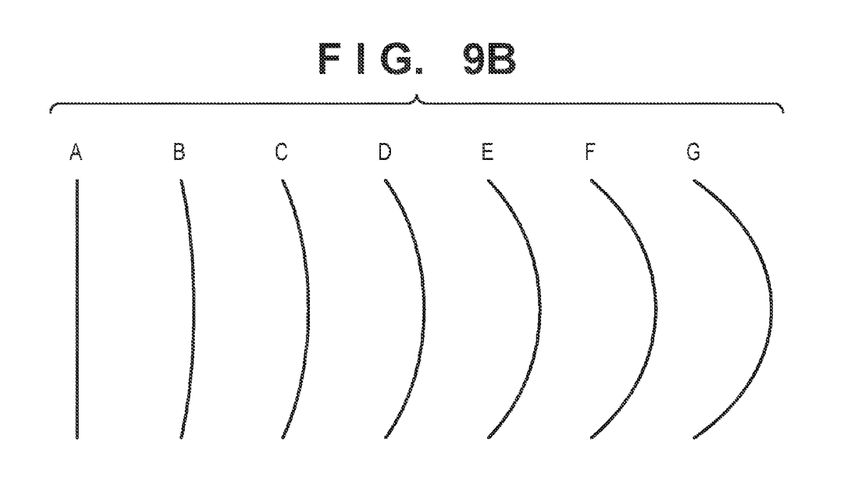

FIGS. 9A and 9B are diagrams illustrating a method of controlling curvature of an image sensor according to the temperature at image capture. In FIG. 9A, the left-most column of the curvature settings (temperature less than 40° C.) is the same as the curvature settings in the case of correcting the curvature of field in FIG. 5A. If the temperature increases, the noise caused by dark current increases, and the noise in the captured image becomes prominent.

For example, in the case where the temperature is 40° C. or more and below 50° C., the curvature setting is shifted by one step as shown by the middle column of the curvature settings. Specifically, if the focal length is 28 mm, the curvature setting suitable for correcting the curvature of field aberration is E, but the curvature setting is shifted by one step to F. That is to say, as shown with the schematic diagram in FIG. 9B, settings are performed so that the bend (curvature) of the image sensing plane of the image sensor 3 is increased. This is because tensile stress is increased the larger the bend (curvature) of the image sensor is, and dark current that occurs is reduced.

Also, if the temperature is 50° C. or more, the curvature setting is further shifted by one step as shown by the curvature settings in the right-most column of the curvature settings. If the focal length is 28 mm, the curvature setting suitable for correcting the curvature of field aberration is E, but the curvature setting is shifted by two steps to G. This is to further reduce noise caused by dark current.

As described above, in the present embodiment, the curvature to which the image sensor is curved according to the temperature at image capture is set to a curvature at which the dark current is reduced by more than at a curvature suitable for correcting the curvature of field aberration of the optical lens. Accordingly, noise in the captured image can be reduced.

Fourth Embodiment

Next, the method of controlling the curvature of the image sensor 3 to reduce dark current in the fourth embodiment according to the present invention will be described below. Note that the configuration of the image capturing apparatus is the same as that for the first embodiment.

Image capturing apparatuses such as digital still cameras and digital video cameras normally have an aperture for adjusting the amount of light incident on the image sensor. Generally, in an imaging optical system, there is a permissible diameter of the circle of confusion regarded to be in focus, and a depth of focus having a certain range exists on the image sensing plane side. Thus, this depth of focus differs depending on aperture value (F value). In other words, if the F value is large the depth of focus is large, and if the F value is small the depth of focus is small. Accordingly, the larger the F value, the less likely it is to see the influence of focus shift caused by the curvature of field for the depth of focus.

Figure 10A:
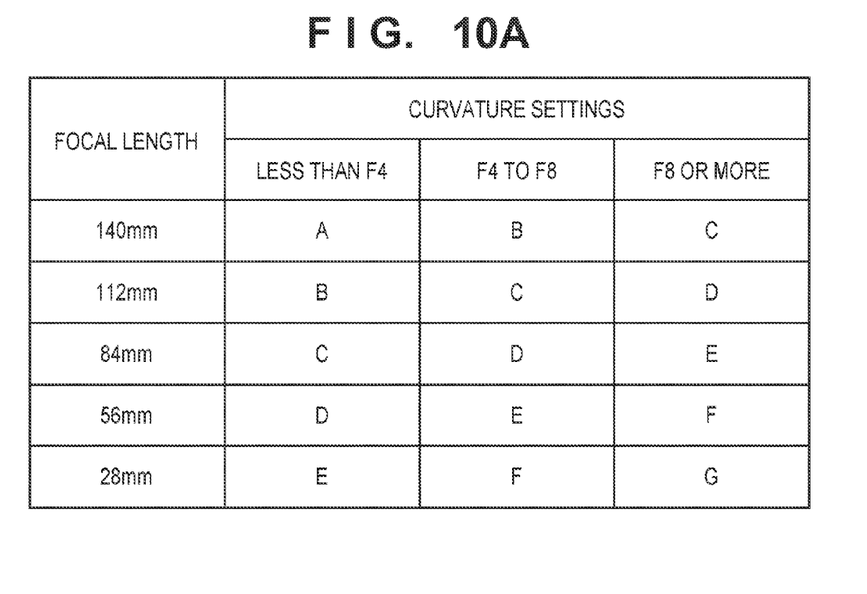
FIGS. 10A and 10B are diagrams illustrating a method of controlling curvature of an image sensor according to an F value.
Figure 10B:
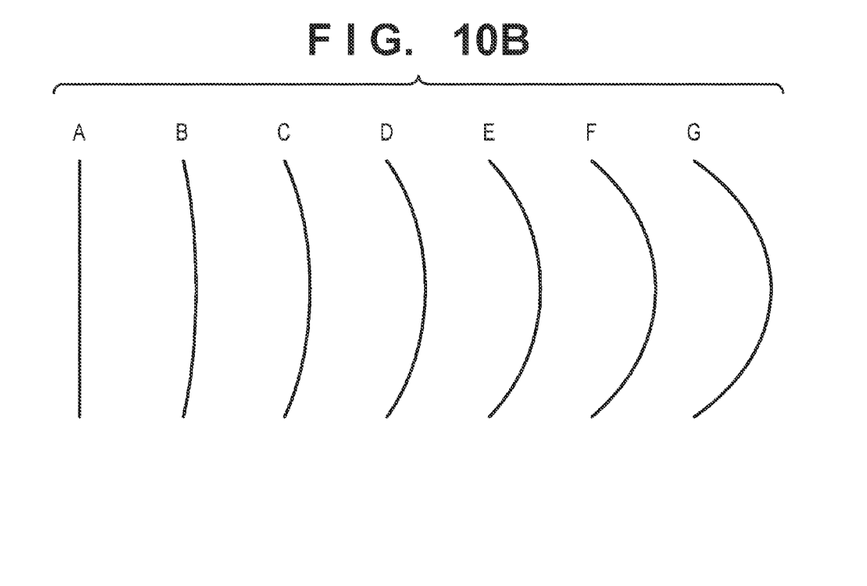

FIGS. 10A and 10B are diagrams illustrating a method of controlling the curvature of an image sensor according to an F value. In FIG. 10A, the left-most column of the curvature settings (less than F4), is the same as the curvature settings in the case of correcting the curvature of field in FIG. 5A. The depth of focus deepens as the F value increases, and therefore the focus shift caused by the curvature of field is not likely to be prominent.

For example, if the aperture value is F4 or more and F8 or less, the curvature settings are shifted by one step as shown by the central column of the curvature settings. Specifically, if the focal length is 28 mm, the curvature setting suitable for correcting the curvature of field aberration is E, but the curvature setting is shifted by one step to F. That is to say, as shown with the schematic diagram in FIG. 10B, settings are performed so that the bend (curvature) of the image sensing plane of the image sensor 3 is increased. This is because tensile stress increases the larger the bend (curvature) of the image sensor is, and dark current that occurs is reduced.

Also, if the aperture value is F8 or above, the curvature setting is further shifted by one step as shown by the curvature settings in the right-most column of the curvature settings. If the focal length is 28 mm, the curvature setting suitable for correcting the curvature of field aberration is E, but the curvature setting is shifted by two steps to G. This is to further reduce noise caused by dark current.

As described above, in the present embodiment, the curvature to which the image sensor is curved according to the F value is set to a curvature at which the dark current is reduced by more than at a curvature suitable for correcting the curvature of field aberration of the optical lens. Accordingly, noise in the captured image can be reduced, even in cases where dark current noise is prominent during, for example, high sensitivity image capturing, long exposure times or the like.

The methods for controlling the curvature of the image sensor with respect to ISO sensitivity, shutter speed, temperature, and F value conditions have thus been described, but control of the curvature of the image sensor may be performed for a combination of a plurality of conditions. Furthermore, control of the curvature of the image sensor may be performed as necessary for conditions other than ISO sensitivity, shutter speed, temperature, and F value.

Incidentally, image capturing apparatuses such as digital still cameras and digital video cameras usually allow for manual selection of a region that is to be in focus, on an image capture screen. Alternatively, the subject that is to be in focus can be selected and focusing can be performed with automatic tracking. In the case where the region or the subject that is desirably in focus is outside of a predetermined range of the image sensing plane of the image sensor, such as when the focus has moved to a peripheral portion of the screen, for example, control may be performed such that correction of the curvature of field aberration of the optical lens is given priority regardless of the state of the lens up until that point, and the curvature of the image sensor in a curved state is aligned with a curvature that is suitable for correcting the curvature of field aberration of the optical lens.

As described above, in the present embodiment, the curvature to which the image sensor is curved according to the shooting conditions is set to a curvature at which the dark current is reduced by more than at a curvature suitable for correcting the curvature of field aberration of the optical lens. Accordingly, noise in the captured image can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-053959, filed Mar. 17, 2015 which is hereby incorporated by reference herein in its entirety.

What is claimed is:

1. An image capturing apparatus comprising:
an image sensor;
an optical system which forms a subject image on an image sensing plane of the image sensor;
a driver which curves the image sensor; and
a controller which controls the driver to curve the image sensor to a curvature according to aberration of the optical system and image capturing conditions,
wherein the controller controls the driver to curve the image sensor to a curvature that prioritizes suppression of a deterioration of an image quality caused by the image capturing conditions over correction of the aberration of the optical system.

2. The image capturing apparatus according to claim 1, wherein the image sensor has a characteristic in which dark current noise varies according to the curvature.

3. The image capturing apparatus according to claim 2, wherein the controller controls the driver to curve the image sensor to a curvature at which the dark current noise in the image sensor decreases.

4. The image capturing apparatus according to claim 1, wherein the driver curves at least the image sensing plane of the image sensor.

5. The image capturing apparatus according to claim 1, wherein the aberration of the optical system includes a curvature of field aberration.

6. The image capturing apparatus according to claim 1, wherein the image capturing conditions include sensitivity.

7. The image capturing apparatus according to claim 1, wherein the image capturing conditions include exposure time of the image sensor.

8. The image capturing apparatus according to claim 1, wherein the image capturing conditions include temperature at image capture.

9. The image capturing apparatus according to claim 1, wherein the image capturing conditions include aperture value.

10. The image capturing apparatus according to claim 1, wherein the driver curves the image sensor by using magnetic force.

11. An image capturing apparatus comprising:
an image sensor;
an optical system which forms a subject image on an image sensing plane of the image sensor;
a driver which curves the image sensor; and
a controller which controls the driver to curve the image sensor to a curvature according to aberration of the optical system and image capturing conditions,
wherein the controller, in a case where a region that is to be focused on in the optical system is outside of a predetermined range of the image sensing plane of the image sensor, controls the driver to curve the image sensor to a curvature that prioritizes correction of the aberration of the optical system.

12. An image capturing apparatus comprising:
an image sensor;
an optical system which forms a subject image on an image sensing plane of the image sensor;
a driver which curves the image sensor; and
a controller which controls the driver to curve the image sensor to a curvature according to aberration of the optical system and image capturing conditions,
wherein the controller, in a case where a subject that is to be focused on in the optical system is outside of a predetermined range of the image sensing plane of the image sensor, controls the driver to curve the image sensor to a curvature that prioritizes correction of the aberration of the optical system.

13. A method of controlling an image capturing apparatus that includes an image sensor, an optical system which forms a subject image on an image sensing plane of the image sensor, and a driver which curves the image sensor, the method comprising:
controlling the driver to curve the image sensor to a curvature according to aberration of the optical system and image capturing conditions,
wherein in the controlling, the driver is controlled to curve the image sensor to a curvature that prioritizes suppression of deterioration of an image quality caused by the image capturing conditions over correction of the aberration of the optical system.

14. A method of controlling an image capturing apparatus that includes an image sensor, an optical system which forms a subject image on an image sensing plane of the image sensor, and a driver which curves the image sensor, the method comprising:
controlling the driver to curve the image sensor to a curvature according to aberration of the optical system and image capturing conditions,
wherein in the controlling, the driver is controlled to curve the image sensor to a curvature that prioritizes correction of the aberration of the optical system in a case where a region that is to be focused on in the optical system is outside of a predetermined range of the image sensing plane of the image sensor.

15. A method of controlling an image capturing apparatus that includes an image sensor, an optical system which forms a subject image on an image sensing plane of the image sensor, and a driver which curves the image sensor, the method comprising:
controlling the driver to curve the image sensor to a curvature according to aberration of the optical system and image capturing conditions, wherein in the controlling, the driver is controlled to curve the image sensor to a curvature that prioritizes correction of the aberration of the optical system in a case where a subject that is to be focused on in the optical system is outside of a predetermined range of the image sensing plane of the image sensor.

\* \* \* \* \*